United States Patent

[11] 3,574,424

| [72] | Inventor | Klaus Hagemeister<br>Munich-Pasing, Germany |
|---|---|---|
| [21] | Appl. No. | 800,841 |
| [22] | Filed | Feb. 20, 1969 |
| [45] | Patented | Apr. 13, 1971 |
| [73] | Assignee | M. A. N. Turbo GmbH<br>Munich-Allach, Germany |
| [32] | Priority | Feb. 23, 1968 |
| [33] | | Austria |
| [31] | | A1759/68 |

[54] AXIALLY LOADED BEARING
11 Claims, 1 Drawing Fig.

[52] U.S. Cl. .................................................. 308/189
[51] Int. Cl. ............................................... F16c 33/00

[50] Field of Search........................................... 308/189.1, 207

[56] References Cited
UNITED STATES PATENTS

| 1,946,439 | 2/1934 | Haller............................ | 308/207.1 |
| 1,982,265 | 11/1934 | Nenninger..................... | 308/207.1 |

FOREIGN PATENTS

| 110,804 | 6/1964 | Czechoslovakia............ | 308/207.1 |

*Primary Examiner*—Fred C. Mattern, Jr.
*Assistant Examiner*—Frank Susko
*Attorney*—Craig, Antonelli, Stewart & Hill ABSTRACT: An axially loaded bearing, in which the axial load is produced hydraulically.

PATENTED APR 13 1971
3,574,424
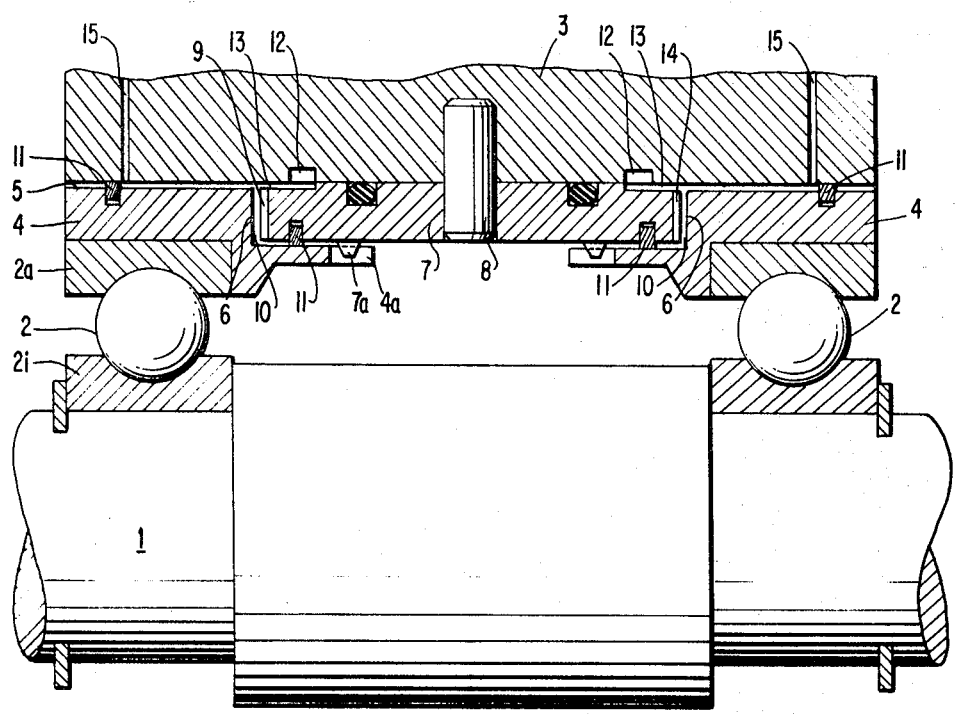
INVENTOR
KLAUS HAGEMEISTER
BY Craig, Antonelli, Stewart & Hill
ATTORNEYS

AXIALLY LOADED BEARING

The present invention relates to bearing assemblies and more particularly to bearing assemblies which are intended for carrying high-speed shafts and comprise one or more ball bearings and means for producing an axial loading of the bearing or bearings.

Axial loading of high-speed ball bearings is used to take up the axial float or play of the bearing in order to hold the balls continuously in contact with the race rings over the entire circumference of the bearing and to avoid damage due to erratic decelerations and accelerations of the balls during operation.

In known bearing assemblies which provide for an axial loading the loading is usually brought about in that one roller bearing is arranged axially displaceably in a housing bore and its outer race is axially prestressed by a spring, while a second bearing forming part of the assembly is arranged so that it cannot move axially. The use of springs in order to apply an axial prestress tending to produce relative movement between the inner and outer race rings entails the disadvantage that an additional vibration-sensitive system liable to vibrate is created in a roller bearing system which is already liable to vibrate in operation, whence in some circumstances the bearing may suffer more damage than the usefulness which is produced by the prestress. In the case of bearing arrangements for the shafts of gas turboengines, particular difficulties stem from the axial thrusts resulting from the gas forces in connection with the bearing support. If the axial thrusts are not to be taken up fully by the bearings themselves, then load balancing pistons must be provided for the compensation. However, a balancing of the axial thrust can not be fully achieved as a rule by balancing pistons in all operating conditions of the turbine or jet engine. Positive and negative deviations result during operation from the intended axial position of the shaft. In order to prevent axial oscillations of the rotor in its bearings, a certain residual thrust must be left acting upon the rotor shaft. However, if resilient means are used for providing this residual thrust in order to compensate for the thrust on the rotor and therewith to relieve a bearing of an axial load, there is the danger that the residual thrust of the rotor and the resilient axial thrust take on the same but opposite values and the bearing then no longer possesses any axial loading force at all. One object of the present invention is to avoid the above disadvantages occurring with spring-loaded roller bearings and to provide prestress or loading means which do not increase the tendency of a bearing to vibrate or oscillate and which remain preserved even with varying axial thrusts on the rotor.

The present invention essentially consists in that the prestress is realized hydraulically. The main advantage of hydraulic prestress for providing for an axial loading of the bearing over resilient prestress means for achieving the same purpose resides in that the loading or prestress force remains constant even with an axial displacement of the supported shaft for instance, of the rotor shaft of a turbomachine, and in that the axial force therefore does not have to be overdesigned, i.e., excessively large in order to allow for such axial movement of the shaft. Furthermore, the oscillation damping effect of the hydraulic liquid is very advantageous because vibrations or oscillations occurring in the machine of which the bearing assembly forms part are kept from the bearing, i.e., are barely transmitted the bearing so that the advantages of loading or prestressing of the bearing can be fully used without having to accept the disadvantages which were inherent heretofore.

A further advantage is that hydraulic liquid in the form of oil which leaks out of the hydraulic system, can be used for lubricating the bearing or bearings.

In accordance with a feature of the present invention the constructions of the hydraulically prestressed bearing assembly is realized in such a manner that the inner race rings of the bearings are seated fixedly on the shaft while the outer race rings are mounted in axially displaceable bushes that are form-lockingly secured against rotation or vice versa. In any case, the inner and outer race rings of a respective bearing are axially displaceable in relation to each other and can be prestressed in this manner. Additionally, by this construction, the rotor is displaceable in the housing so that it is able to support itself in both directions at abutments during changing axial thrusts.

In accordance with a still further feature of the present invention with an arrangement of the inner race rings of the bearings mounted fixedly on the shaft, the socket bushes are constructed as flange bushings, whereby the slide with the greatest diameter thereof in the offset housing bore and thereby become effective as annular pistons. The constructions of socket bushes for the bearing rings as flange bushings is advantageous because the thus resulting annular pistons assure a uniform distribution in the circumferential direction of the prestress to be produced on the bearing rings. Furthermore, owing to the close tolerances at both diameters, a good guidance of the flange bushings along the axis is obtained which has a favorable effect on the operating accuracy of the bearings.

In accordance with a still further feature of the present invention the annular pistons are sealed against the housing by means of sealing rings such as O-rings or piston rings which serve to prevent an excessive rate of flow of hydraulic liquid through the pressure space and to prevent excessive leakage of oil out of the spaces adjacent to the annular piston faces of the bushed.

The dimensioning of the assembly is preferably such that in the central position of the shaft, that is to say the position between its two limits of axial movement, there is a small clearance left between the annular piston end face of each bush and the associated housing offset so that an annular space is formed by the annular pistons and housing which serves as pressure cylinder for the production of the prestress force for the bearing. With the arrangement of two bearings, the axial dimension between the shoulders of the socket bushings is therefore somewhat larger than the corresponding dimension between the offset of the housing bore. The bearing assembly moves by the amount of this play, which depends on the manufacturing tolerances and thermal expansions, and therewith the rotor moves to-and-fro by such amount during thrust changes, whereby the movement is damped by the oil disposed therebetween.

In accordance with a still further feature of the invention the pressure oil is supplied to the pressure space by way of annular grooves concentric about the bearing axis while the leakage oil is conducted away through radial bores in the housing within the area of the outer edge of the socket bushings. The provision of discharge bores serves the purpose of a continuous flushing of the pressure space with fresh oil in order to avoid the collection of dirt in the gaps and an excessive heating of the oil which might lead to cavitation.

According to a further development and feature of the present invention the end faces of the offset of the housing bore are provided with radial bores which are in communication with the pressure oil circulatory system. It is achieved thereby that the oil pressure and therewith the bearing prestress remains effective unchanged also when the end face of a socket bushing abuts against the housing offset as a result of an unbalanced axial thrust of the rotor. A particular construction of the present invention is characterized in that, instead of an offset in the housing bore, a bushing is inserted. The use of a bushing for the purpose of producing an offset housing bore simplifies production with complicated bearing places and offers the possibility of the subsequent installation of the hydraulic bearing prestress assembly of the present invention into already existing conventional bearing arrangements.

Accordingly, it is an object of the present invention to provide an axially prestressed bearing which avoids, by simple means, the aforementioned shortcomings and drawbacks encountered in the prior art.

Another object of the present invention resides in an axially loaded bearing in which an axial loading force is assured under all operating conditions.

A further object of the present invention resides in an axially prestressed bearing which does not increase the tendency in the part of the bearing to vibrate or oscillate.

A still further object of the present invention resides in a hydraulically prestressed bearing of the type described above which remains under prestress regardless of displacements of the shaft supported thereby.

Still another object of the present invention resides in an axially loaded bearing in which the hydraulic pressure medium not only acts as oscillation damping means but also as lubricant for the bearing.

Another object of the present invention resides in an axially prestressed bearing adapted to be readily installed into existing facilities.

A further object of the present invention resides in an axially loaded bearing which prevents accumulations of dirt in and precludes excessive heating of the bearing.

These and other objects features and advantages of the present invention will become more obvious from the following description when taken in connection with the accompanying drawing which shows, for purposes of illustration only, one embodiment in accordance with the present invention, and wherein The single FIGURE is an axial cross-sectional view through an axially loaded bearing in accordance with the present invention.

Referring now to the single FIGURE of the drawing, a bearing assembly is shown in this FIGURE which includes two ball bearings 2. The bearings 2 support a shaft 1 which, however, does not form part of the bearing assembly as such. The inner race rings 2i of the bearings are fixed on the shaft 1 in a conventional manner to preclude relative axial movement. The outer race rings 2a are mounted in the flange bushings 4. The bushings 4 slide within a cylindrical bore 5 provided in a bearing housing 3 which acts as a supporting means. The shoulders 6 on the bushings 4 correspond to, i.e., are opposite to and have the same diameter as the ends of a bushing 7 which is held by means of a pin 8 in the bore 5. The bushing 7 has the function of forming a part of lesser internal diameter between the bushing 4. The dimensions of the flange bushings 4 are so chosen as to leave annular gaps 10 between the end faces or shoulders 9 of bushing 7 and the annular end faces 6 of the bushings 4 formed by the offsets thereof. The axial float or play of the shaft 1, which can be a rotor shaft of a turbine or of a jet engine, is equal to twice the axial width of an annular gap 10. The bushings 4 are provided with teeth 4a which interlock with teeth 7a on the bushing 7 and are thus form-lockingly secured against rotation to prevent the bushings 4 from rotating in relation to bushing 7, while a certain amount of axial movement of the bushings 4 is permitted. The teeth 4a, 7a are thereby so constructed that they remain in engagement over the entire range of axial movements of the bushings 4 with respect to housing 3. The annular gaps 10 are sealed off at the glide surfaces by means of piston rings 11 mounted in grooves. Annular grooves 12 are machined into the housing bore 5 within the outer area of the bushing 7 so as to be overlapped by the ends of the bushing 7. These grooves 12 are connected with longitudinal grooves 13 in the bushing 7. The end faces 9 of the bushing 7 are provided with radial grooves 14 which remain in communication the annular channels 12 by way of the longitudinal grooves 13, even in case of abutment of shoulder 6 of a bushing 4 against the end face 9 of the bushing 7 and thereby assure that hydraulic liquid from grooves 12 can act against end face 9 of bushing 4 even if the bushing 4 abuts against the bushing 7. Radial ducts or bores 15 which serve for draining hydraulic fluid that leaks between the cylindrical faces on the bushings 4 and the corresponding cylindrical faces in the housing 3, are provided in the housing 3 within the area of the outer edge of the bushings 4.

In order to produce the axial loading or prestress force for the bearings 2, the annular grooves or ducts 12 are connected with a pressure oil circulation system (not shown). The oil passes through grooves 13 into the gaps 10 forming the pressure cylinders so that an axial loading or prestress force is produced in accordance with the magnitude of the oil pressure and the area of the annular shoulders 6 of bushings 4. The force is supported at the inner race rings by way of the outer race rings and the balls of the bearing, whence results a play-free operation of the bearing since the balls of the ball bearings are pressed against the outer parts of the grooves in the inner race rings. If the shaft 1 is subjected to a net axial thrust, i.e., to an unbalanced thrust, then the shaft moves axially in the thrust direction until the annular piston face or shoulder 6 of the corresponding bushing 4 abuts against an end face 9 of the bushing 7. The axial loading or prestress in each bearing remains preserved also in case of the abutment of the shoulder 6 of a bushing 4 against the end face 9 of the bushing 7.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such modifications as are within the scope of those skilled in the art.

I claim:

1. An axially loaded bearing assembly, especially for a high-speed shaft, wherein hydraulic means are provided for realizing the axial prestress, comprising a plurality of antifriction bearing means, each of the bearing means having an inner race ring fixedly mounted on the shaft and an outer race ring form-lockingly mounted in a flange bushing, the flange bushings being axially movable in relation to each other by sliding in a supporting means and arranged therein to act as annular pistons, and means for preventing the flange bushings from rotating about the bearing axis.

2. A bearing assembly in accordance with claim 1, comprising sealing rings mounted in grooves for producing sealing joints between the supporting means and the flange bushings.

3. A bearing assembly in accordance with claim 2, in which the flange bushings are mounted in cylindrical recesses in the supporting means on either side of a part of lesser internal diameter than the recesses, the end faces formed at the ends of the part of lesser diameter being axially opposite annular piston faces on the flange bushings.

4. A bearing assembly in accordance with claim 3, comprising grooves substantially concentric about the bearing axis, for supplying hydraulic liquid to the annular piston faces, and radial ducts for draining oil leaking between cylindrical surfaces on the flange bushings and in the supporting means.

5. A bearing assembly in accordance with claim 4, further comprising radial grooves for leading hydraulic fluid between the piston faces and the ends of the part of lesser diameter.

6. A bearing assembly in accordance with claim 5, in which the part of lesser diameter is in the form of a bush inserted into the supporting means.

7. A bearing assembly according to claim 12, in which in an axial center position of the shaft, a small clearance is produced between a respective end face of an annular piston and the corresponding offset so that an annular space is formed between each annular piston and the housing which serves as pressure cylinder for producing the axial load on the bearing.

8. A bearing assembly according to claim 9, in which pressure oil is supplied to the pressure space by way annular grooves in the housing bore while the leakage oil is discharged by way of radial bores in the housing within the area of the outer edge of the flange bushings.

9. A bearing assembly according to claim 8, in which the end face of each offset is offset is provided with a radial groove in communication with a pressure oil circulation systems.

10. A bearing assembly according to claim 9, wherein the offset is effectively formed by a bushing inserted into the housing bore.

11. A bearing assembly with a housing according to claim 1, wherein the flange bushings slide with the outer diameters in an offset formed within a housing bore and thus forming annular pistons.